June 13, 1961 L. E. HERR 2,988,161
SUSPENSION CONTROL ARM CONSTRUCTION
Filed May 22, 1959 3 Sheets-Sheet 3

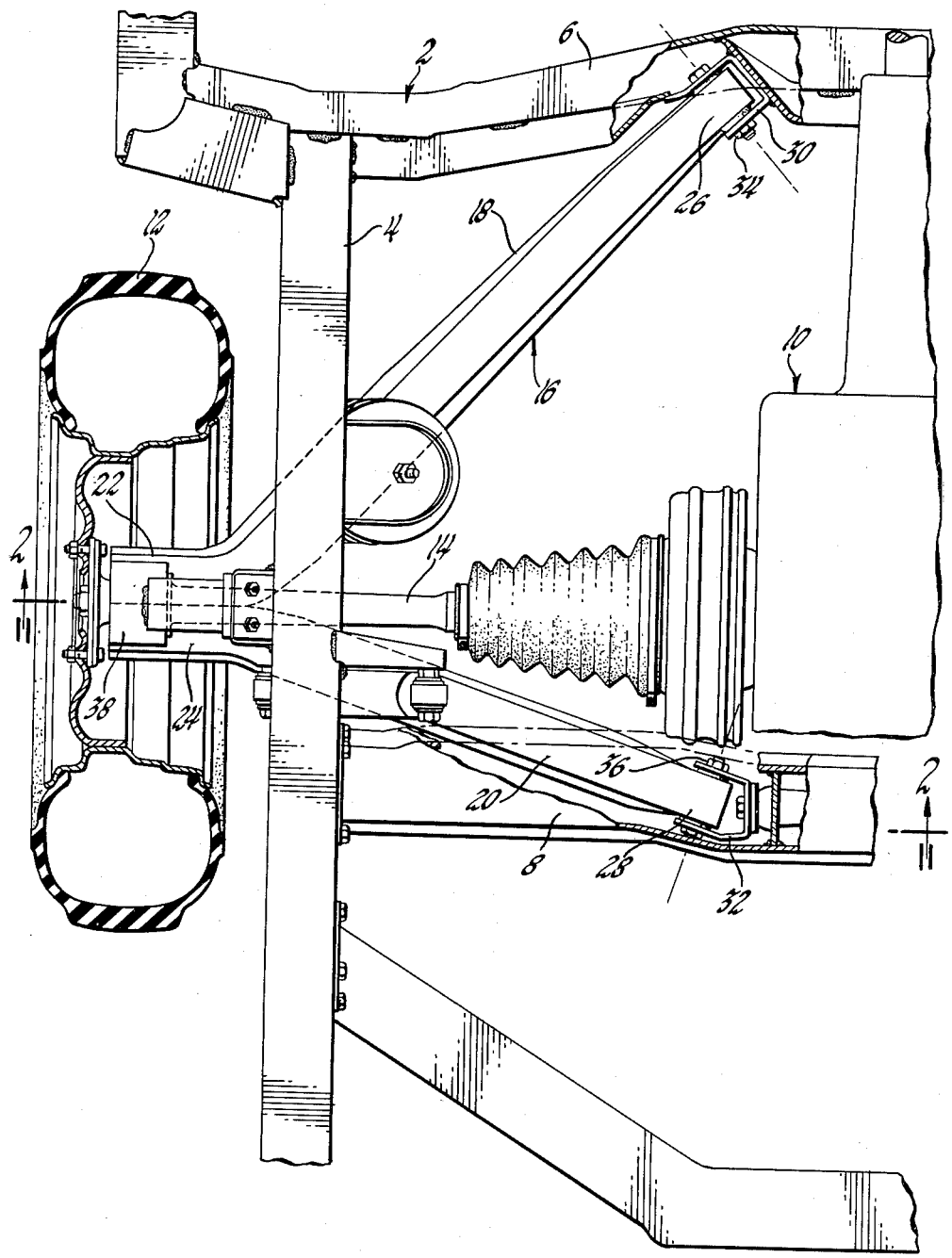

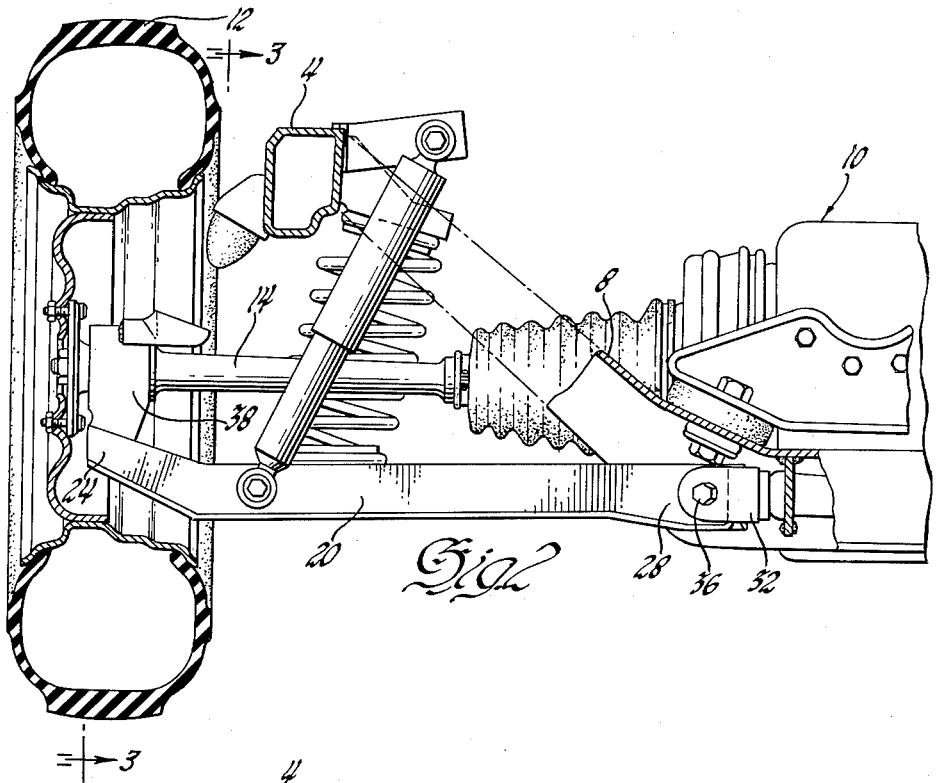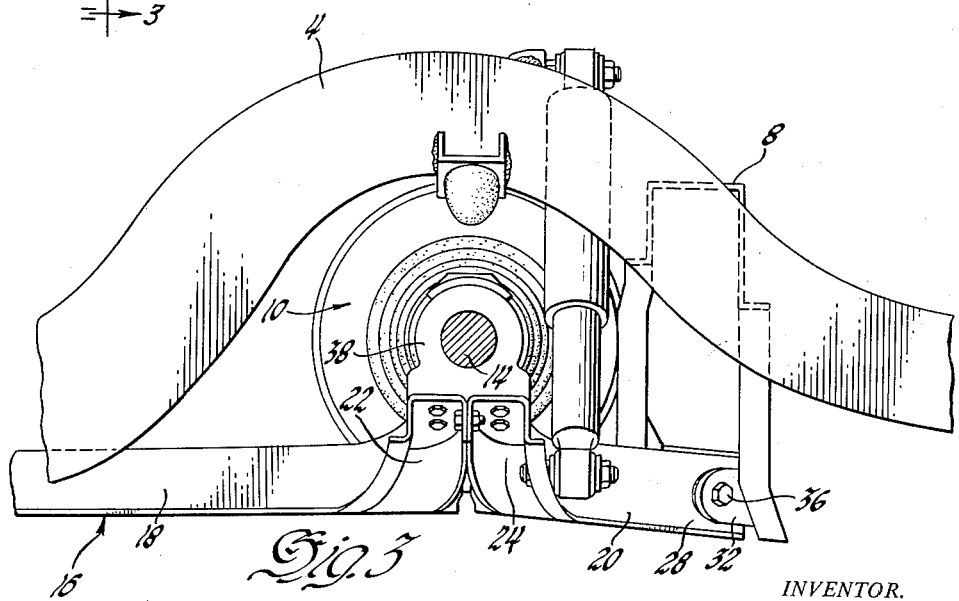

INVENTOR.
Lewis E. Herr
BY
W. F. Wagner
ATTORNEY

United States Patent Office 2,988,161
Patented June 13, 1961

2,988,161
SUSPENSION CONTROL ARM CONSTRUCTION
Lewis E. Herr, Pontiac, Mich., assignor to General Motors Corporation, Detroit, Mich., a corporation of Delaware
Filed May 22, 1959, Ser. No. 815,201
7 Claims. (Cl. 180—73)

This invention relates to vehicle suspension and more particularly to improved suspension control arm construction and arrangement therefor.

In the prior art, wheel suspension control arms in general have been subjected to horizontal bending loads when the vehicle was braked, accelerated or cornered. As a result, such control arms have customarily been fabricated from material of relatively massive section in order to assure adequate margin of safety. While it is apparent that given sufficient space, control arms may be fashioned which will satisfactorily resist even the most excessive loads, it follows that such components will unduly increase the unsprung vehicle weight and significantly increase the cost of production of the vehicle.

An object of the invention is to provide an improved vehicle suspension structure.

Another object is to provide a vehicle suspension incorporating a wheel control arm constructed and arranged so as to gain optimum utilization of material by elimination of all horizontal bending loads thereon.

A further object is to provide a wheel control arm construction of the stated character which is characterized by extreme simplicity of form, fabrication and assembly.

Still a further object is to provide a wishbone type wheel suspension control arm comprising two channel section sheet metal legs arranged in converging relation toward their outer ends and connected together thereat with wheel journalling means incorporating a spherical bearing, the geometric center of which lies on the intersection of the sheer centers of the two legs, the inboard end of each leg being pivoted to the vehicle sprung mass on a horizontal axis perpendicular to a vertical plane passing through the major axis of the leg.

A still further object is to provide a wheel suspension utilizing a wishbone type wheel control arm which is connected to the sprung mass and wheel, respectively, in a manner whereby all horizontal forces exerted on the wheel load the arm only in tension or compression.

These and other objects, advantages, and features of the invention will become more fully apparent as reference is had to the accompanying specification and drawings wherein:

FIG. 1 is a partial plan view of a vehicle chassis rear suspension incorporating the present invention;

FIG. 2 is a fragmentary end elevational view looking in the direction of arrows 2—2 of FIG. 1;

FIG. 3 is a side elevational view, partly in section, looking in the direction of arrows 3—3 of FIG. 2.

Figure 4:
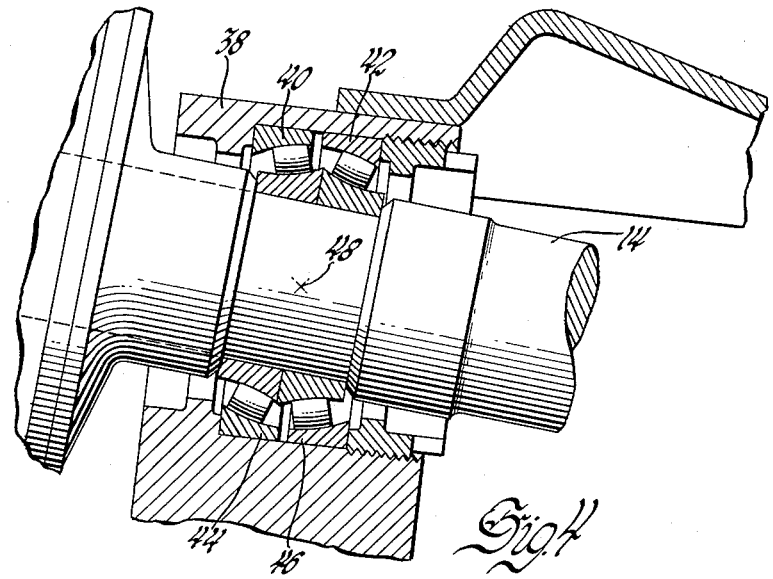
FIG. 4 is an enlarged fragmentary view, partly in section, illustrating the wheel driving axle journalling means associated with the outboard end of the control arm.

Referring now to the drawings, the reference numeral 2 designates generally the vehicle frame or sprung mass which includes a side rail member 4 and longitudinally spaced front and rear cross members 6 and 8, respectively. Resiliently mounted on cross frame members 6 and 8 is an engine driven differential mechanism 10. Laterally outboard of frame side rail 4 is a vehicle traction wheel 12 which is operatively connected to differential 10 by means of an articulated driving axle 14.

In accordance with the present invention, wheel 12 and the outboard end of axle 14 are rotatably supported on an V frame or wishbone type of control arm structure 16 which is so constructed and arranged as to require a minimum of material in relation to the maximum loads imposed thereon during vehicle operation. As seen best in FIG. 1, control arm 16 is formed of a forward leg 18 and a rearward leg 20 arranged in inwardly diverging relation. Legs 18 and 20 are fabricated from sheet metal of generally U-shaped cross section and are joined together at their outboard ends 22 and 24. At their inboard ends 26 and 28, legs 18 and 20 are pivotally connected to frame mounted brackets 30 and 32 by means of rubber bushed pin joints 34 and 36. As seen best in FIGS. 2 and 3, pin joints 34 and 36 are located vertically below the normal wheel axis of rotation and hence arm 16 describes an arc somewhat different than the arc described by the drive axle 14 during rise and fall of wheel 12. Accordingly, in order to accommodate such dissimilarity of arcuate movement, the outboard ends 22 and 24 of legs 18 and 20 have joined thereto a hub member 38 which has disposed therein a spherical bearing support comprised of a pair of barrel-type roller bearing assemblies 40 and 42 arranged in back-to-back relation. To accommodate the change in relative inclination in control arm 16 and drive axle 14, the outer races 44 and 46 of bearing assemblies 40 and 42 generate about a common imaginary point 48 which is colinear with the axis of rotation of drive axle 14.

According to another feature of the invention, the imaginary point 48 is also coincidental with the point of intersection of the shear centers of legs 18 and 20 so that all horizontal forces exerted on the wheel are transmitted to the legs through such point, the shear center of each leg being defined as the intersection of bending axis with the transverse section of the leg. It will be appreciated that the shear center for different shapes of transverse section, both uniform and non-uniform, will vary and hence must be calculated in each individual case. Conversely, where a given shear center location is desired, the cross sectional configuration may be adjusted to obtain the desired result. Inasmuch as the shear center theory and its application to various transverse sections is well known to those skilled in the art, further discussion is omitted.

In accordance with another feature of the invention, the projected axes of pin joints 34 and 36 are disposed horizontally and perpendicular to a vertical plane passing through the major axis of the associated legs 18 and 20, respectively.

Figure 5:
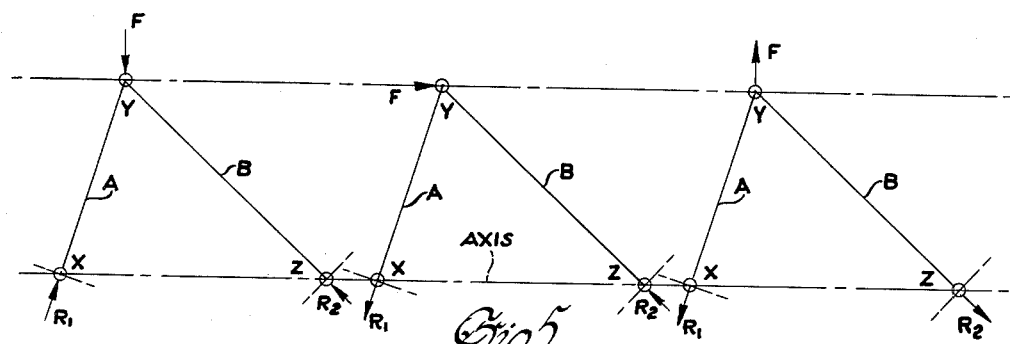
FIG. 5 is a force diagram depicting the resolution of forces in a suspension structure according to the invention.
Figure 6:
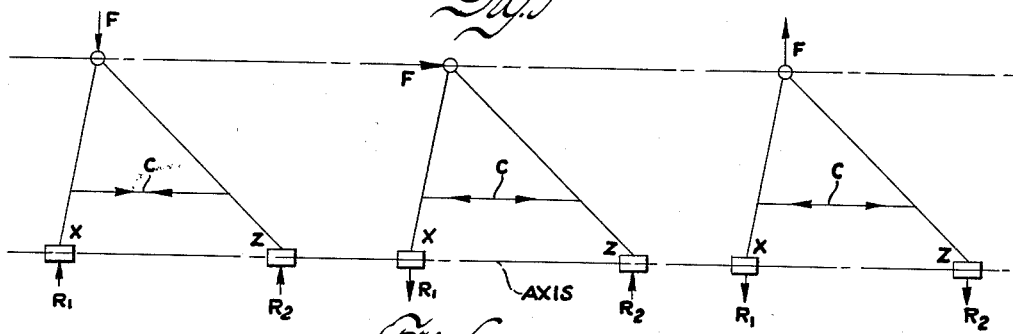
FIG. 6 is a force diagram illustrating the resolution of forces in a conventional control arm construction.

In order that the invention may be more fully understood, reference is now made to FIGS. 5 and 6 which illustrate respectively the resoultion of forces in a construction according to the present invention and in prior art structures. Assuming the wishbone control arm to be made up of two links A and B, which are pinned together at X, Y, and Z; from the equation of statics it can be seen that reactions $R_1$ and $R_2$ must act through the pinned ends of arms A and B. Therefore, only tension or compression exists in these members. Assuming now that point Y is replaced by a spherical bearing and points X and Z are replaced by rubber bushed pin joints having their longitudinal axis perpendicular to the reactions $R_1$ and $R_2$, then the type of loading will remain unchanged. Legs A and B can now be fastened together at point Y and the load will still be exerted through the geometric center of the spherical bearing and the reactions $R_1$ and $R_2$ will not be changed. Since legs A and B carry only tension or compression with no lateral bending, the need for a strut such as C in FIG. 6 is unnecessary. In addition, the legs A and B may be lighter construction since they are not required to resist bending moment such as exists in a construction according to FIG. 6. In constructions according to FIG. 6, horizontal bending loads always exist because the bushings X and Z are not perpendicular to the planes of legs A and B as is the case in FIG. 5. It will be noted that although the common axis of bushings X and Z in FIG. 5 forms the rotational axis of the control arm, this axis, of course, does not line up with the indivdual axis of the respective bushings. While this geometric error would result in a locked mechanism if the bushings were solid inflexible sleeve bearings, by the use of rubber bushings, the slight angular dissimilarity is absorbed by the rubber. In practice, it has been found that the apparent difficulty presented by the aforementioned dissimilarity of axes is exceedingly slightly owing to the very limited range of vertical deflection of the control arm which is on the order of 12° above and 12° below horizontal.

In addition to the significant advantages in terms of weight savings and economy of material, the present invention affords the additional advantage of allowing the use of simplified rubber bushing constructions. Thus, in prior art constructions, it has been customary to use so-called headed rubber bushings, to resist thrust forces ($F_1$ and $F_2$ in FIG. 6) on the inboard pivots. These bushings complicate assembly problems and add undesirable rate and friction characteristics. By contrast, unheaded bushings may be used with the present invention since no thrust loads are exerted on the bushings.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In a swing axle suspension, a supported portion, a wheel supporting transversely extending control arm, said control arm comprising a pair of channel section legs arranged in a manner defining two outwardly converging vertical planes, means rigidly connecting the outboard ends of said legs together, wheel journalling means fixedly mounted on the connected ends of said legs, the axis of said journalling means being displaced vertically from the horizontal plane of said arm, and a pivot member at the inner end of each leg connecting the latter to said supported portion, the axis of rotation of each pivot connection being parallel with the horizontal plane of said arm and perpendicular to the vertical plane of the associated leg.

2. In a motor vehicle having a frame mounted differential assembly, a driving wheel, a swingable half axle rigidly connected to said wheel and operatively engaging said differential, a wishbone type wheel control arm extending between said wheel and said frame, said control arm comprising a pair of inverted channel section legs arranged in a manner defining two outwardly converging vertical planes, means rigidly connecting the outboard ends of said legs together, axle journalling means mounted on the connected ends of said legs, said journalling means including a spherical bearing assembly, the geometric center of which lies at the intersection of said vertical planes in vertically spaced relation from the horizontal plane of said arm, and a pin joint assembly at the inner end of each leg connecting the latter to said supported portion, each pin joint assembly defining an axis of rotation which is substantially parallel with the horizontal plane of said arm and perpendicular to the vertical plane of the associated leg.

3. The structure set forth in claim 2 wherein the projected axis of each pin joint assembly is spaced vertically below the axis of rotation of the associated wheel.

4. The structure set forth in claim 2 wherein each pin joint assembly includes elastomeric bushings capable of sufficient deflection to absorb geometric error between said assemblies resulting from vertical deflection of said arm.

5. The structure set forth in claim 2 wherein said means rigidly connecting the outboard ends of said legs together form the sole connection therebetween.

6. The structure set forth in claim 2 wherein the geometric center of said spherical bearing assembly is coincidental with the shear center of each leg.

7. In a wishbone type wheel control farm of the type utilizing separate converging channel section legs connected together at their outboard ends, pivot bearings formed at the inboard end of each leg, which bearings are disposed respectively on axes perpendicular to the shear center of the associated leg, the said outboard ends of the channel section legs forming a wheel connecting member on the outboard end of said arm which is located so that the effective center of said connecting member lies at the intersection of the shear centers of said legs.

References Cited in the file of this patent

UNITED STATES PATENTS

| | | |
|---|---|---|
| 2,309,811 | Utz | Feb. 2, 1943 |
| 2,582,426 | Greene | Jan. 15, 1952 |